United States Patent
Peuhkurinen

(10) Patent No.: US 12,197,638 B1
(45) Date of Patent: Jan. 14, 2025

(54) USING USER'S COMPUTING DEVICE FOR RENDERING AND STREAMING

(71) Applicant: Varjo Technologies Oy, Helsinki (FI)

(72) Inventor: Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/457,511

(22) Filed: Aug. 29, 2023

(51) Int. Cl.
*G06F 3/01* (2006.01)
*H04W 76/14* (2018.01)

(52) U.S. Cl.
CPC ............ *G06F 3/012* (2013.01); *H04W 76/14* (2018.02)

(58) Field of Classification Search
CPC ...................................................... H04W 76/14
See application file for complete search history.

(56) References Cited

U.S. PATENT DOCUMENTS

| | | | | |
|---|---|---|---|---|
| 2018/0109447 A1* | 4/2018 | Mudric | ............... | H04L 65/1073 |
| 2023/0110088 A1* | 4/2023 | Ghosh | .................. | H04L 67/535 |
| | | | | 709/232 |
| 2023/0376574 A1* | 11/2023 | Igarashi | .................... | H04L 9/50 |

* cited by examiner

*Primary Examiner* — Nitin Patel
*Assistant Examiner* — Amen W Bogale
(74) *Attorney, Agent, or Firm* — Ziegler IP Law Group LLC

(57) ABSTRACT

Disclosed is an extended-reality (XR) device with pose-tracking means; light source(s) for displaying XR images to a user; and a processor configured to: send, to a server a network address of an XR device; send, to the server, request to provide a network address of a computing device; receive, from the server, the network address of the computing device; establish a direct communication link between the XR device and the computing device, using the network address of the computing device; send, to the computing device, information indicative of a pose of XR device or of a head of the user, via the direct communication link; receive, from computing device, XR image(s) generated according to the pose, via direct communication link; and display XR image(s) via light source(s).

11 Claims, 4 Drawing Sheets

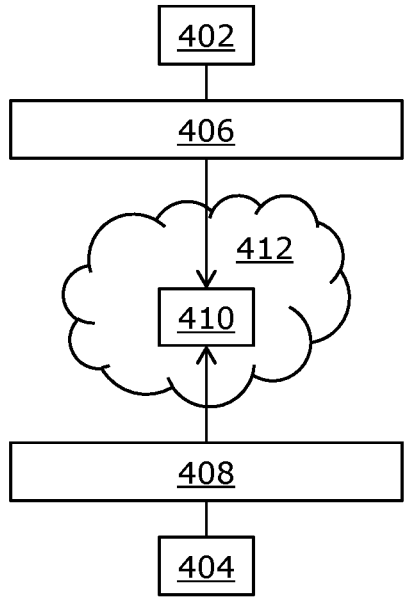
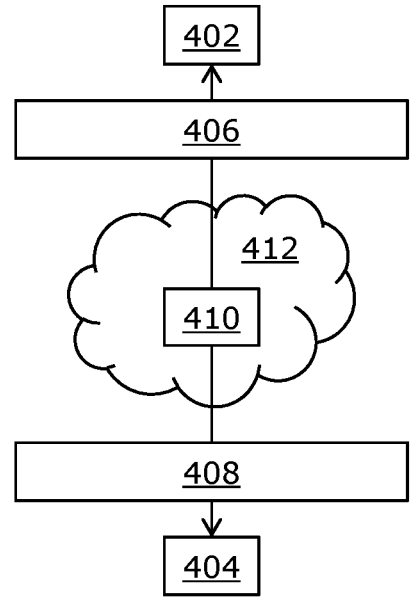
FIG. 4A  FIG. 4B
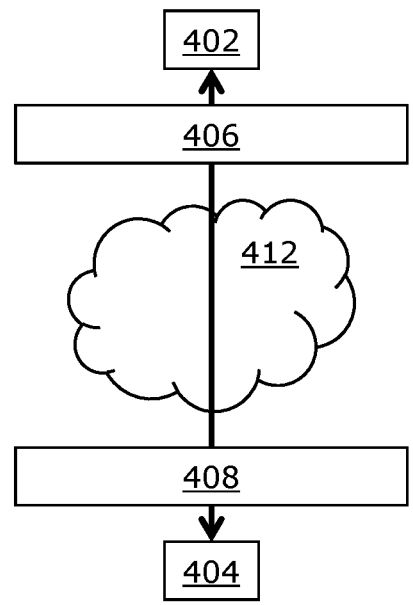
FIG. 4C

USING USER'S COMPUTING DEVICE FOR RENDERING AND STREAMING

TECHNICAL FIELD

The present disclosure relates to extended-reality (XR) devices using user's computing devices for rendering and streaming. The present disclosure also relates to computing devices for rendering and streaming for XR devices. The present disclosure further relates to systems for using user's computing devices for rendering and streaming.

BACKGROUND

In recent times, there has been an ever-increasing demand for image generation. For example, such a demand may be quite high and critical in case of evolving technologies such as immersive extended-reality (XR) technologies which are being employed in various fields such as entertainment, real estate, training, medical imaging operations, simulators, navigation, and the like. Such immersive XR technologies create XR environments for presentation to a user of an XR device (such as an XR headset, a pair of XR glasses, or similar).

However, existing equipment and techniques for generating XR images for XR devices have certain limitations. Firstly, existing equipment and techniques employ a rendering server (such as a cloud server or a remote server) for an XR device, for generating XR images corresponding to an XR environment, and then the generated images are received by the XR device from the rendering server for subsequent displaying thereon. When multiple XR devices are connected to the same rendering server, there are considerable delays/latency involved in generating and/or displaying the XR images whilst the user's pose is constantly changing. Moreover, during high demand, such image generation could be computationally-intensive and time-consuming for the rendering server.

Secondly, purchasing services of the rendering server for generating the XR images could be very expensive for users. Existing techniques do not allow users to use their own computing devices for generating the XR images, due to presence of network security barriers (for example, such as firewalls and routers) associated with the XR devices and the computing devices, as well as unavailability of software applications for rendering the XR images.

Therefore, in light of the foregoing discussion, there exists a need to overcome the aforementioned drawbacks associated with existing equipment and techniques for generating XR images for XR devices.

SUMMARY

The present disclosure seeks to provide an extended-reality (XR) device, a computing device, and a system for facilitating in displaying high-quality and realistic XR images at the XR device, the XR images being generated using user's own computing device, in real time or near-real time. The aim of present disclosure is achieved by an XR device using user's computing device for rendering and streaming, a computing device for rendering and streaming for an XR device, and a system for using user's computing device for rendering and streaming, as defined in the appended independent claims to which reference is made to. Advantageous features are set out in the appended dependent claims.

Embodiments of the present disclosure substantially eliminate or at least partially address the aforementioned problems in the prior art, and facilitate in displaying high-quality and realistic XR images at the XR device, the XR images being generated using the user's own computing device, in real time or near-real time.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 4A, 4B, and 4C illustrate different phases in establishing a direct communication link between an extended-reality (XR) device and a computing device, in accordance with an embodiment of the present disclosure;

DETAILED DESCRIPTION OF EMBODIMENTS

Figure 1:
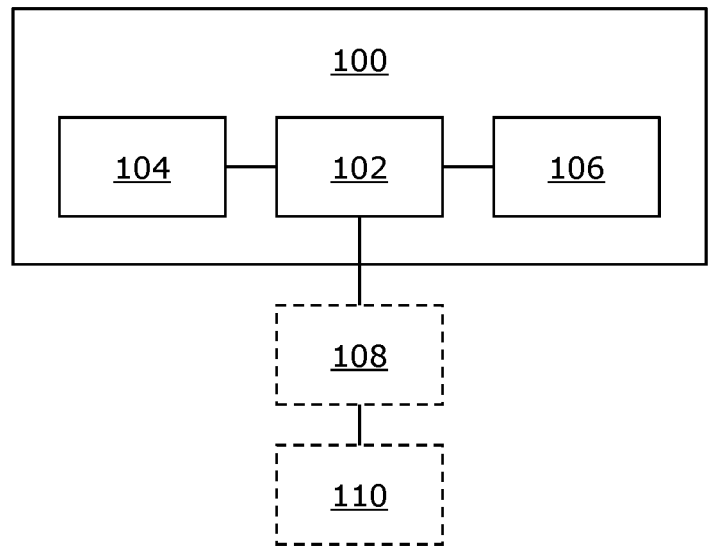
FIG. 1 illustrates a block diagram of an architecture of an extended-reality (XR) device, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an extended-reality device comprising:
  pose-tracking means;
  at least one light source that is to be employed to display extended-reality images to a user; and
  a processor configured to:
    send, to a server, a network address of the extended-reality device;
    send, to the server, a request to provide a network address of a computing device owned by the user;
    receive, from the server, the network address of the computing device;
    establish a direct communication link between the extended-reality device and the computing device, using the network address of the computing device;

send, to the computing device, information indicative of a pose of the extended-reality device or of a head of the user, via the direct communication link;

receive, from the computing device, at least one extended-reality image generated according to said pose, via the direct communication link; and display the at least one extended-reality image via the at least one light source.

In a second aspect, an embodiment of the present disclosure provides a computing device comprising at least one processor configured to:

send, to a server, a network address of the computing device;

receive, from the server, a network address of an extended-reality device of a user;

establish a direct communication link between the computing device and the extended-reality device, using the network address of the extended-reality device;

receive, from the extended-reality device, information indicative of a pose of the extended-reality device or of a head of the user, via the direct communication link;

generate at least one extended-reality image, based on said pose; and send the at least one extended-reality image to the extended-reality device, via the direct communication link.

In a third aspect, an embodiment of the present disclosure provides a system comprising a plurality of extended-reality devices of the first aspect and a plurality of computing devices of the second aspect, wherein a processor of each extended-reality device is configured to establish a direct communication link between said extended-reality device and a respective one of the plurality of computing devices, wherein at least one processor of a first computing device from amongst the plurality of computing devices is configured to:

receive, from a server, a network address of at least one second computing device from amongst the plurality of computing devices;

use the network address of the at least one second computing device to establish a direct communication link between the first computing device and the at least one second computing device;

receive, from the at least one second computing device, information indicative of a pose of at least one second extended-reality device corresponding to the at least one second computing device or of a head of at least one second user of the at least one second extended-reality device;

generate at least one extended-reality image, based on a pose of a first extended-reality device corresponding to the first computing device or of a head of a first user of the first extended-reality device, wherein a portion of the at least one extended-reality image indicates a relative pose of the at least one second extended-reality device or of the head of the at least one second user with respect to the pose of the first extended-reality device or of the head of the first user; and send the at least one extended-reality image to the first extended-reality device, via a corresponding direct communication link.

The present disclosure provides the aforementioned extended-reality (XR) device, the aforementioned computing device, and the aforementioned system. Herein, the direct communication link is established between the XR device and the computing device, using their network addresses. Resultantly, dependency of the server for data transmission between the aforesaid devices is minimised, as said data transmission is now conveniently performed via the direct communication link in a fast, reliable, and smooth manner. Advantageously, this facilitates in minimising delay/latency involved in generating the XR images at the computing device and displaying the XR images at the XR device, whilst the user's pose is constantly changing. The direct communication link can be established and works well irrespective of geographical locations of the XR device and the computing device. Furthermore, connecting the XR device with the computing device is neither time-consuming nor cumbersome, even with presence of network security barriers (for example, such as firewalls and routers). Moreover, the system facilitates in providing an accurate, immersive, and realistic XR experience in a multiuser scenario, i.e., when multiple users are collaborating together in a same XR environment. The XR device, the computing device, and the system are simple, robust, support real-time high-quality generation/displaying of XR images, and can be implemented with ease. Enabling the user to use her/his own computing device for rendering and streaming the XR images also reduces the cost to the user, as the user does not need to purchase any rendering and streaming services from a rendering server (for example, such as a cloud server).

Throughout the present disclosure, the term "extended-reality device" refers to a specialized equipment that is configured to present an extended-reality (XR) environment to a user when said XR device, in operation, is worn by the user on his/her head. The XR device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like. The XR device could be utilized in various fields for example, such as gaming, education, healthcare, architecture, military, entertainment, and the like.

Throughout the present disclosure, the term "pose-tracking means" refers to specialized equipment that is employed to detect and/or follow the pose of the XR device or of the head of the user within a real-world environment. The term "pose" encompasses a position and/or an orientation. In practice, the pose-tracking means is actually employed to track the pose of the XR device; the pose of the head of the user corresponds to the pose of the XR device, as the XR device is worn by the user on his/her head. Pursuant to embodiments of the present disclosure, the pose-tracking means is implemented as a true six Degrees of Freedom (6-DoF) tracking system. In other words, said pose-tracking means is configured to track translational movements (namely, surge, heave and sway movements) and rotational movements (namely, roll, pitch and yaw movements) of the head of the user or of the XR device within a 3D space of the real-world environment whereat the XR device and the user are present. In this regard, the processor of the XR device is configured to obtain the information indicative of the pose of the XR device or of the head of the user from the pose-tracking means.

The pose-tracking means could be implemented as an internal component of the XR device, as a tracking system external to the XR device, or as a combination thereof. The pose-tracking means could be implemented as at least one of: an optics-based tracking system (which utilizes, for example, infrared beacons and detectors, infrared (IR) cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, or the like. A detector may be implemented as at least one of: an IR camera, an IR transceiver, a visible-light camera, an RFID reader.

The pose-tracking means may employ an outside-in tracking technique, an inside-out tracking technique, or a combination of both the aforesaid tracking techniques, for collecting pose-tracking data, said pose-tracking data constitutes the information indicative of the pose of the XR device or of the head of the user. Optionally, the pose-tracking data comprises at least one of: images, IMU/TIMU values, motion sensor data values, magnetic field strength values. Optionally, the processor is configured to employ at least one data processing algorithm to process the pose-tracking data, to determine the pose of the XR device or of the head of the user. Correspondingly, requisite data processing algorithm(s) is/are employed to process the pose-tracking data, to determine said pose. Examples of the at least one data processing algorithm include a feature detection algorithm, an environment mapping algorithm, a data extrapolation algorithm, and the like.

Notably, a given XR image is displayed to the user via the at least one light source. Throughout the present disclosure, the term "light source" refers to an element from which light emanates. Optionally, a given light source is implemented as a display. In this regard, the given XR image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given XR image is projected onto a projection screen or directly onto a retina of user's eyes. Examples of such a projector include, but are not limited to, an LCD-based projector, an LED-based projector, an OLED-based projector, an LCOS-based projector, a Digital Light Processing (DLP)-based projector, and a laser projector. Optionally, the given light source is a single-resolution light source or a multi-resolution light source.

In the first aspect, notably, the processor of the XR device controls an overall operation of the XR device. The processor is communicably coupled to the at least one light source, the pose-tracking means, and the server. In the second aspect, notably, the at least one processor of the computing device controls an overall operation of the computing device. The at least one processor is communicably coupled to the server.

Throughout the present disclosure, the term "network address" of a given device refers to a logical address or a physical address of the given device that is connected to a communication network. Said communication network may, for example, be a local network (for example, local area network (LAN), Ethernet, Wi-Fi, and the like) or a global network (for example, such as the Internet). The network address of the given device may, for example, be expressed in form of a numeric code, an alphabetic code, an alphanumeric code, or similar. It is to be understood that the network address of the given device uniquely identifies the given device on the communication network. Thus, different devices on the communication network have different and unique network addresses. Examples of the network address may include, but are not limited to, an Internet Protocol (IP) address, a Media Access Control (MAC) address, a host address. The term "given device" encompasses the XR device and/or the computing device. Network addresses are well-known in the art.

In the first aspect, optionally, the network address of the XR device is pre-stored at a data repository that is communicably coupled to the processor of the XR device. In the second aspect, optionally, the network address of the computing device is pre-stored at a data repository that is communicably coupled to the at least one processor of the computing device. It will be appreciated that the network address of the XR device and the network address of the computing device are sent to the server in real time or near-real time. It will also be appreciated that the data repository could, for example, be implemented as a memory of a given processor, a memory of the given device, a removable memory, a cloud-based database, or similar. The term "given processor" encompasses the processor of the XR device and/or the at least one processor of the computing device.

Throughout the present disclosure, the term "computing device" refers to a device that is capable of at least generating XR images for the XR device. Notably, the computing device is owned by the user of the XR device. In this regard, the computing device and the XR device may be present in a same geographical location or different geographical locations. Examples of the computing device include, but are not limited to, a laptop, a desktop computer, a tablet, a phablet, a personal digital assistant, a workstation, and a console.

Notably, for establishing the direct communication link between the XR device and the computing device, network addresses of both the XR device and the computing device are required. Thus, the processor of the XR device is configured to generate and send the request, to the server, for providing the network address of the computing device. Such a request may have a specific format/syntax, and may be in a form of a keyword, a subroutine, a Uniform Resource Locator (URL), or similar. Moreover, there may be a scenario when multiple computing devices are owned by the user, and are connected to the (same) communication network. In such a case, the processor of the XR device is configured to send a request, to the server, for providing a network address of a particular computing device from amongst the multiple computing devices.

In the first aspect, notably, once the request is received by the server, the network address of the computing device is sent to the XR device, the network address of the computing device being already known to the server. In the second aspect, notably, once the request is received from the XR device, the server is configured to send the network address of the XR device to the computing device (in real time or near-real time).

Throughout the present disclosure, the phrase "direct communication link" between the XR device and the computing device refers to a communication link that enables direct data transmission between the XR device and the computing device. In other words, the direct communication link facilitates in transmission of data directly between the aforesaid devices, i.e., without any intervention of the server, in real-time or near-real time. Moreover, the direct communication link enables said transmission of data even when network security barriers (for example, such as firewalls and routers) are present between the XR device and the computing device. Said data transmission can be serial data transmission or parallel data transmission.

It will be appreciated that once the XR device has the network address of the computing device and the computing device has the network address of the XR device, the direct communication link between the XR device and the computing device can be established, for example, using a socket connection. The socket connection enables in exchanging a series of messages between the aforesaid devices that negotiate connection parameters, for example, such as the network addresses (such as IP addresses) and port numbers of the aforesaid devices, for establishing the direct communication link. Said negotiation is like a handshake between the aforesaid devices, where the aforesaid devices introduce themselves to each other, and agree on the connection parameters for establishing the direct communication link. It will be appreciated that when the aforesaid devices are arranged behind certain network security barriers, a hole punching technique can be employed to establish the socket connection. The hole punching technique uses a third-party server (for example, the server) to help the aforesaid devices punch a hole in their respective network security barriers, for enabling them to establish the direct communication link. The socket connection and the hole punching technique are well-known in the art.

In the first aspect, optionally, the processor of the XR device is configured to:
  send, to the server, information pertaining to a device configuration of the extended-reality device;
  receive, from the server, information pertaining to a device configuration of the computing device; and
  select a communication protocol for establishing the direct communication link, based on the device configuration of the extended-reality device and the device configuration of the computing device.

Similarly, in the second aspect, optionally, the at least one processor of the computing device is configured to:
  send, to the server, information pertaining to the device configuration of the computing device;
  receive, from the server, information pertaining to the device configuration of the extended-reality device; and
  select a communication protocol for establishing the direct communication link, based on the device configuration of the extended-reality device and the device configuration of the computing device.

Throughout the present disclosure, the term "device configuration" of a given device refers to hardware configuration and/or software configuration of the given device. In other words, the device configuration of the given device comprises specific settings, characteristics, and parameters indicative of hardware and software capabilities of the given device.

Optionally, the device configuration of the XR device comprises at least one of: a type of the XR device, a display configuration of the XR device, a type of network connectivity of the XR device, encoder/decoder information of the XR device, a device compatibility of the XR device with other devices, a type of an input peripheral of the XR device, tracking means of the XR device, a type of a camera of the XR device, a type of an audio device of the XR device. The type of the XR device could be an XR headset, a pair of XR glasses, or the like. The display configuration may be indicative of at least one of: a number of light sources in the XR device, a resolution of a given light source, a type of the given light source. The type of network connectivity could indicate a network bandwidth of the XR device. The encoder/decoder information could be indicative of encoder/decoder standards (for example, such as H.264, H.265, H.266, VP9, and the like) supported by the XR device. The type of the input peripheral can be a hand-tracking device, a touch screen, a mouse, a keyboard, an XR controller, or the like. The tracking means could be gaze-tracking means, pose-tracking means, and the like.

Optionally, the device configuration of the computing device comprises at least one of: a type of the computing device, encoder/decoder information of the computing device, a type of network connectivity of the computing device, a device compatibility of the computing device with other devices. The type of the computing device can be a laptop, a desktop computer, a tablet, or the like. The encoder/decoder information could be indicative of encoder/decoder standards (for example, such as H.264, H.265, H.266, VP9, and the like) supported by the computing device. The type of network connectivity could indicate a network bandwidth of the computing device.

When establishing the direct communication link between the XR device and the computing device, it is important to consider their respective device configurations, since different devices may have different capabilities and limitations. As an example, different devices may support different types of network protocols, have different network bandwidths or have different restrictions on an amount of data that can be transmitted or received. Thus, device configurations of both the XR device and the computing device are taken into account for selecting a most appropriate communication protocol that works well with the hardware and software capabilities of both the aforesaid devices, for establishing the direct communication link. Such a selection could potentially facilitate in an improved performance of the (established) direct communication link, for example, in terms of minimizing latency, reducing packet loss, maximizing data throughput, and the like. Selection of a communication protocol based on device configurations of different devices is well-known in the art. Examples of the communication protocol include, but are not limited to, a Transmission Control Protocol (TCP), a User Datagram Protocol (UDP), a Hyper Text Transfer Protocol (HTTP), a Simple Mail Transfer Protocol (SMTP), a File Transfer Protocol (FTP), a Domain Name System (DNS), an Internet Protocol (IP).

In an example, when the XR device has a high-resolution display and requires low latency, a communication protocol appropriate for providing high-bandwidth and low-latency data transmission may be selected. In another example, when the computing device has limited processing resources and a slower network interface, a communication protocol appropriate for low-bandwidth or intermittent network connections may be selected.

It will be appreciated that upon establishing the direct communication link, the server could be used for lightweight control data, wherein both the XR device and the computing device could be configured to report their connection status to the server, for example, by periodically sending a signal to the server to indicate that the direct communication link between the XR device and the computing device is still active. When the server does not receive said signals, it could mean that said direct communication link has been lost or interrupted, for example, due to network failure issues. In such a case, said direct communication link could be re-established using updated network information of either or both of the XR device and the computing device.

It will also be appreciated that the direct communication link may be a single direct communication link or multiple simultaneous direct communication links. However, a number of the multiple simultaneous direct communication links that can be established between the XR device and the computing device may depend on several factors, for example, such as an available network bandwidth of the aforesaid devices, processing resources of the aforesaid devices, a number of available ports of the aforesaid devices, types of communication protocols to be used, and the like.

In the first aspect, optionally, the processor of the XR device is configured to send, to the server, a request to provide the information pertaining to the device configuration of the computing device. In the second aspect, optionally, the at least one processor of the computing device is configured to send, to the server, a request to provide the information pertaining to the device configuration of the XR device.

Once the direct communication link is established, the information indicative of the pose of the XR device or of the head of the user is directly sent from the XR device to the computing device. It will be appreciated that said information is sent to the computing device throughout a given XR session of using the XR device, in order to enable the computing device to generate up-to-date pose-consistent XR image(s) throughout the given XR session. The at least one XR image represents a region of the XR environment from a perspective of said pose. The at least one XR image frame may pertain to an XR game, an XR tutorial, an XR instructional simulator, an XR movie, an XR educational video, or the like. Generating the at least one XR image based on said pose is well-known in the art.

Optionally, when generating the XR image based on said pose, the at least one processor is configured to employ at least one image processing algorithm. Optionally, the at least one image processing algorithm comprises at least one of: a computer-generated imagery algorithm, an image cropping algorithm, an image flipping algorithm, an image rotating algorithm, an image sharpening algorithm, an image smoothing algorithm, an image blurring algorithm, an image resizing algorithm, an image orientation algorithm, an image colour-change algorithm, an image merging algorithm, an image slicing algorithm, an image layering algorithm, an image blending algorithm, an image special-effects algorithm. Such algorithms are well-known in the art.

Optionally, the XR device further comprises gaze-tracking means, wherein the processor of the XR device is configured to send, to the computing device, information indicative of a gaze direction of the user's eye, via the direct communication link, wherein the at least one XR image is generated according to said gaze direction also.

It will be appreciated that the at least one XR image comprises colour data, and additionally, optionally, comprises at least one of: alpha data, depth data, velocity data. The colour data may, for example, be Red-Green-Blue (RGB) data, Red-Green-Blue-Depth (RGB-D) data, Red-Green-Blue-Alpha (RGB-A) data, Cyan-Magenta-Yellow-Black (CMYK) data, Luminance and two-colour differences (YUV) data, or the like. The alpha data includes alpha values for each pixel in the at least one XR image. As an example, in a range of 0 to 255, an alpha value of 0 could indicate fully transparent, and an alpha value of 255 could indicate fully opaque. The depth data includes depth values for each pixel in the at least one XR image. The velocity data includes velocity vectors for each pixel or each group of pixels in the at least one XR image. When a pixel represents a stationary object or a stationary portion of an object, a velocity vector of said pixel is zero. When a pixel represents a moving object or a moving portion of an object, a velocity vector of said pixel is non-zero.

Optionally, the at least one processor of the computing device is configured to send, to the XR device, metainformation indicative of at least one of: a timestamp of the at least one XR image, the pose according to which the at least one XR image is generated. Such metainformation is sent along with the at least one XR image.

Optionally, the at least one processor of the computing device is configured to generate the at least one extended-reality image, based further on the device configuration of the extended-reality device. In this regard, in order to generate the at least one XR image realistically and accurately in real time or near-real time by judiciously utilizing processing resources of the at least one processor of the computing device, information pertaining to the device configuration of the XR device is taken into account. Optionally, in this regard, the at least one processor of the computing device is configured to generate the at least one XR image according to at least one of: a display resolution of the at least one light source of the XR device, the number of light sources, a frame rate of displaying the XR images. Thus, the at least one XR image is accurately and realistically generated, which potentially enhances a viewing experience of the user of the XR device. In an example, when the display resolution of the at least one light source is known, the at least one processor of the computing device is configured to generate the at least one XR image according to said display resolution only.

Optionally, prior to sending the at least one XR image, the at least one processor of the computing device is configured to encode the at least one XR image. It will be appreciated that an encoded XR image would require lesser storage and transmission resources as compared to the at least one XR image, and thus could be transmitted to the XR device in a bandwidth-efficient manner. Such an encoding also reduces a lag between image generation and image displaying.

In the first aspect, in an embodiment, the processor of the XR device is configured to send, to the server, information indicative of a software application to be executed at the computing device for generating extended-reality images, prior to establishing the direct communication link. Accordingly, in the second aspect, in an embodiment, the at least one processor of the computing device is configured to:
receive, from the server, information indicative of a software application to be executed for generating extended-reality images; and
arrange to execute the software application prior to establishing the direct communication link.

This allows the computing device to arrange the software application beforehand. Beneficially, this minimizes latency/delay involved in providing an XR experience to the user of the XR device as generation and displaying of the at least one XR image could be started as soon as the direct communication link is established. It will be appreciated that the XR device could send the information indicative of the software application to the server along with the network address of the XR device. In such a case, the computing device could receive the aforesaid information from the server, along with the network address of the XR device.

Throughout the present disclosure, the term "software application" refers to an XR experience application that, when executed at the computing device, generates XR images representing an XR environment. Optionally, the software application pertains to at least one of: an XR game, an XR advertisement, an XR infotainment, a XR navigation, XR simulation, an XR entertainment, an XR training, an XR tourism.

Optionally, the at least one processor of the computing device is configured to arrange to execute the software application by downloading the software application from any one of: the server, a third-party application provider. In this regard, the software application need not necessarily be pre-stored at the data repository communicably coupled to the at least one processor of the computing device prior to its execution. Thus, the software application is conveniently downloaded from the server or the third-party application provider as and when required, and then is installed and executed by the at least one processor of the computing device. When the software application is already available at said data repository, the step of downloading the software application can be completely skipped.

Optionally, a plurality of software applications are stored at a data repository that is communicably coupled to the server. In this regard, the software application is selected from amongst the plurality of software applications, and is downloaded by the at least one processor of the computing device. The term "third-party application provider" refers to an entity that is capable of developing and/or providing software applications that are designed to work on a particular device, a particular platform, and/or a particular operating system. Optionally, the plurality of software applications are stored at a database of the third-party application provider.

Furthermore, optionally, the software application is executed in a secured environment in the computing device. In this regard, the execution of the software application is isolated from execution of other software applications on the computing device. Beneficially, this facilitates enhanced security, performance, and stability of the software application during its execution, as the execution of the software application is less likely to be affected by the execution of the other software applications. Moreover, by isolating the software application during its execution, vulnerabilities or security weaknesses in the other software applications are potentially less likely to be exploited to compromise the security of the software application. This may help in reducing a risk of unauthorized access, data breaches, and other security incidents. It will be appreciated that once a given XR session of using the XR device and the computing device is over, any data or settings associated with the execution of the software application on the computing device, as well as allocation of processing resources of the at least one processor used during said execution, can be wiped from (or reset on) the computing device. Advantageously, this potentially facilitates in ensuring that any sensitive data or information that may be generated during the execution of the software application is not stored or is not accessible once the given XR session is over. This potentially enhances the security and privacy for the user of the XR device.

In the first aspect, in another embodiment, the processor of the XR device is configured to send, to the computing device, information indicative of the software application to be executed for generating the extended-reality images, after establishing the direct communication link. Accordingly, in the second aspect, in another embodiment, the at least one processor is configured to:
receive, from the extended-reality device, information indicative of a software application to be executed for generating extended-reality images, via the direct communication link; and
arrange to execute the software application.

In this regard, upon establishing the direct communication link, the processor of the XR device is configured to communicate the information indicative of the software application directly to the computing device. This is particularly beneficial in a scenario when the user is provided with an option to select a given software application from amongst the plurality of software applications that are available at the computing device. In such a case, only upon said selection, the given software application is executed at the computing device for generating the XR images. Such a selection can be performed using an input device of the XR device. Examples of the input device may include, but are not limited to, a computer mouse, a keyboard, a joystick, a touchpad, a gamepad, an interactive board, a remote controller, a XR console, and an XR controller.

It will be appreciated that the plurality of software applications could be already available at the computing device (i.e., pre-installed on the computing device) or be downloaded by the at least one processor of the computing device from the server or the third-party application provider (upon said selection). In an example, the user may select a software application pertaining to an XR game from amongst a plurality of software applications pertaining to an XR advertisement, a XR navigation, XR simulation, an XR entertainment, an XR tourism, and the XR game. Furthermore, sending the aforesaid information to the computing device may also be beneficial in a scenario when the user wants to switch from a currently-executing software application to another (new) software application. It will be appreciated that the processor of the XR device could be configured to store a list of the plurality of software applications at the data repository coupled to the processor, for subsequent XR sessions on the XR device.

The present disclosure also relates to the system as described above. Various embodiments and variants disclosed above, with respect to the aforementioned first aspect and second aspect, apply mutatis mutandis to the system.

It will be appreciated that the first computing device and the at least one second computing device operate in a same manner as the computing device of the first aspect and the computing device of the second aspect. Similarly, the first XR device and the at least one second XR device operate in a same manner as the XR device of the first aspect and the XR device of the second aspect. Establishment of the direct communication link between the first computing device and the at least one second computing device is done in a same manner as described earlier. The at least one second computing device may comprise a single computing device or multiple computing devices. The system of the third aspect facilitates in providing an accurate and realistic XR experience in a multiuser scenario, i.e., when multiple users are collaborating together in a same XR environment.

Optionally, each of the first XR device and the at least one second XR device comprises pose-tracking means. The pose of the at least one second XR device or of the head of the at least one second user is received by the at least one second computing device via a direct communication link between the at least one second XR device and the at least one second computing device, in real time or near-real time. In some implementations, both the first XR device and the at least one second XR device are virtually present in the same XR environment as well as physically present in a same real-world environment; in such a case, their poses are tracked in the same real-world environment. In other implementations, the first XR device and the at least one second XR device are virtually present in the same XR environment, but are physically present in different real-world environments; in such a case, their poses are tracked separately in the different real-world environments.

When generating the at least one XR image for the first XR device, the pose of the at least one second XR device or of the head of the at least one second user is utilised in addition to the pose of the first XR device or of the head of the first user, in order to ascertain how the at least one second XR device or the at least one second user would appear from a perspective of the pose of the first XR device or the first user, and thus how the at least one second XR device or the at least one second user should be represented in the at least one XR image. This may be because the aforesaid relative pose can be understood to be a pose offset measured between the first XR device and the at least one second XR device within the same XR environment. This enables each user's XR device to render a visual representation of other users in a way that accurately reflects their poses in the same XR environment, thereby enhancing viewing experiences of the users within the same XR environment.

Optionally, said portion of the at least one extended-reality image virtually represents at least one of: the at least one second extended-reality device, the at least one second user, a body part of the at least one second user. In this regard, when the first XR device and the at least one second XR device are employed in the same real-world environment, the at least one of: the at least one second XR device, the at least one second user, the body part of the at least one second user, may lie within a field of view from a perspective of the first XR device. Since the pose of the first XR device or of the head of the first user and the aforesaid relative pose are accurately known to the at least one processor of the first computing device, the at least one processor of the first computing device can easily determine what lies within the field of view from the perspective of the first XR device. Therefore, the at least one processor of the first computing device is optionally configured to process said portion of the at least one XR image to virtually represent in said portion the at least one of: the at least one second XR device, the at least one second user, the body part of the at least one second user. The at least one XR image, upon said processing, provides a realistic, pose-consistent view to be displayed at the first XR device. Optionally, when generating the at least one XR image, the at least one processor of the first computing device is configured to digitally superimpose upon or blend into said portion of the at least one XR image, a virtual representation of the at least one of: the at least one second XR device, the at least one second user, the body part of the at least one second user. Such a blending of the virtual representation could be performed based on available depth information from the perspective of the first XR device.

In an example, the at least one processor of the first computing device may be configured to process the at least one XR image to virtually represent a face of the at least one second user in said portion of the at least one XR image. The face of the at least one second user may, for example, be captured by a tracking camera of the at least one second XR device, or may be represented in a pre-stored image of the at least one second user. The at least one processor of the first computing device could be configured to obtain the captured image from said tracking camera or the prestored image, and utilise it to generate a virtual representation of the face. The virtual representation of the face may, for example, be digitally superimposed on said portion. The virtual representation of a face of a given user may be considered to be an "avatar" of the given user. In another example, the at least one processor of the first computing device may be configured to process the at least one XR image to virtually represent in said portion the body part of the at least one second user, wherein the body part comprises at least one of: the face of the at least one second user, a hand of the at least one second user, a leg of the at least one second user.

DETAILED DESCRIPTION OF THE DRAWINGS

Referring to FIG. 1, illustrated is a block diagram of an architecture of an extended-reality (XR) device 100 using user's computing device for rendering and streaming, in accordance with an embodiment of the present disclosure. The XR device 100 comprises at least one processor (depicted as a processor 102), pose-tracking means 104, and at least one light source (depicted as a light source 106). The processor 102 is communicably coupled to the pose-tracking means 104 and the light source 106. The processor 102 is also communicably coupled to a server 108 that is communicably coupled to a computing device 110.

It may be understood by a person skilled in the art that FIG. 1 includes a simplified architecture of the XR device 100, for sake of clarity, which should not unduly limit the scope of the claims herein. It is to be understood that the specific implementation of the XR device 100 is provided as an example and is not to be construed as limiting it to specific numbers or specific types of processors, pose-tracking means, light sources, servers, and computing devices. The person skilled in the art will recognize many variations, alternatives, and modifications of embodiments of the present disclosure.

Figure 2:
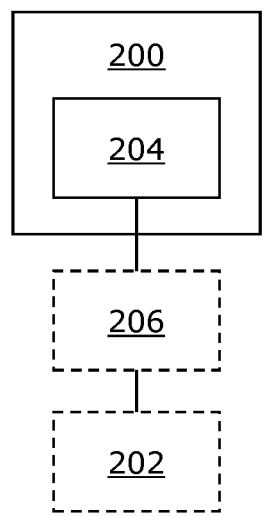
FIG. 2 illustrates a block diagram of an architecture of a computing device for rendering and streaming for an extended-reality (XR) device, in accordance with an embodiment of the present disclosure.

Referring to FIG. 2, illustrated is a block diagram of an architecture of a computing device 200 for rendering and streaming extended-reality (XR) images for an XR device 202, in accordance with an embodiment of the present disclosure. The computing device 200 comprises at least one processor (depicted as a processor 204). The processor 204 is communicably coupled to a server 206 that is communicably coupled to the XR device 202.

It may be understood by a person skilled in the art that FIG. 2 includes a simplified architecture of the computing device 200, for sake of clarity, which should not unduly limit the scope of the claims herein. It is to be understood that the specific implementation of the computing device 200 is provided as an example and is not to be construed as limiting it to specific numbers or specific types of computing devices, processors, servers, and XR devices. The person skilled in the art will recognize many variations, alternatives, and modifications of embodiments of the present disclosure.

Figure 3:
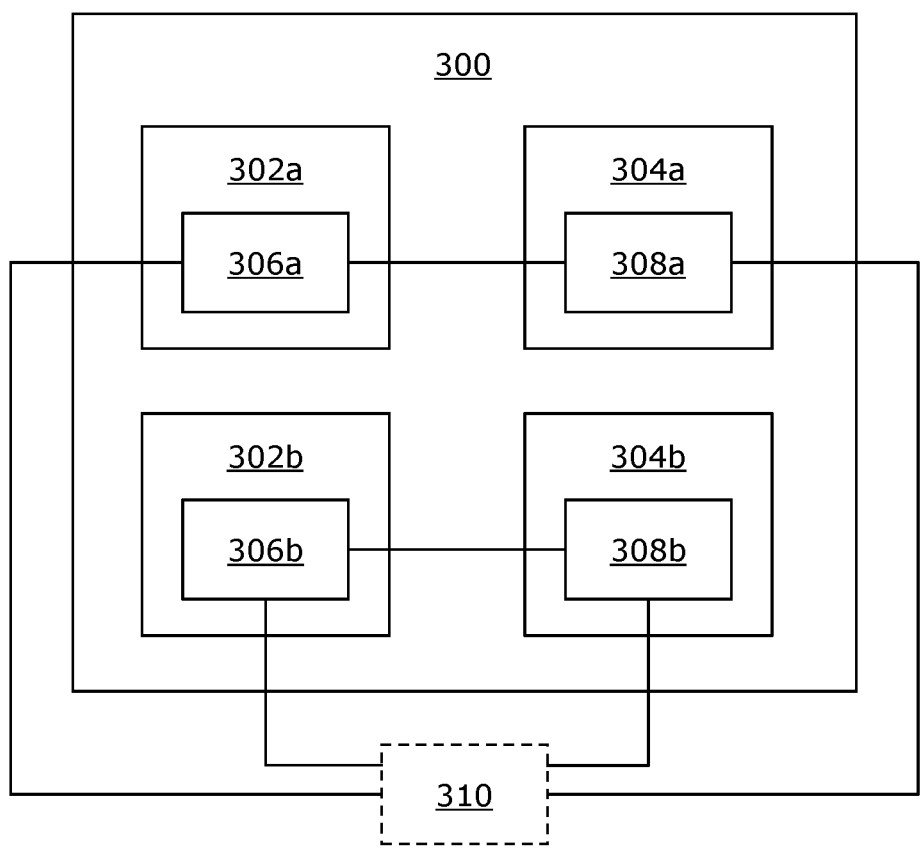
FIG. 3 illustrates a block diagram of an architecture of a system for using user's computing device for rendering and streaming, in accordance with an embodiment of the present disclosure.

Referring to FIG. 3, illustrated is a block diagram of an architecture of a system 300 for using user's computing device for rendering and streaming, in accordance with an embodiment of the present disclosure. The system 300 comprises a plurality of extended-reality (XR) devices (for example, depicted as a first XR device 302a and a second XR device 302b) and a plurality of computing devices (for example, depicted as a first computing device 304a and a second computing device 304b). The first XR device 302a and the second XR device 302b comprise processors 306a and 306b, respectively. The first computing device 304a and the second computing device 304b comprise processors 308a and 308b, respectively. The processors 306a and 306b are communicably coupled to the processors 308a and 308b, respectively, via direct communication links. The processors 306a-b and 308a-b are also communicably coupled to a server 310.

It may be understood by a person skilled in the art that FIG. 3 includes a simplified architecture of the system 300, for sake of clarity, which should not unduly limit the scope of the claims herein. It is to be understood that the specific implementation of the system 300 is provided as an example and is not to be construed as limiting it to specific numbers or specific types of XR devices, computing devices, processors, and servers. The person skilled in the art will recognize many variations, alternatives, and modifications of embodiments of the present disclosure.

Referring to FIGS. 4A, 4B, and 4C, illustrated are different phases in establishing a direct communication link between an extended-reality (XR) device 402 and a computing device 404, in accordance with an embodiment of the present disclosure. With reference to FIGS. 4A-4C, the XR device 402 and the computing device 404 are protected by network security barriers 406 and 408, respectively. Such network security barriers could, for example, be firewalls, routers and the like. With reference to FIG. 4A, a first phase in establishing the direct communication link is shown, wherein the XR device 402 sends a network address of the XR device 402 to a server 410, and the computing device 404 sends a network address of the computing device 404 to the server 410, via a communication network 412 (for example, such as the Internet). With reference to FIG. 4B, a second phase in establishing the direct communication link is shown, wherein the XR device 402 receives the network address of the computing device 404 from the server 410, and the computing device 404 receives the network address of the XR device 402 from the server 410. With reference to FIG. 4C, a third phase in establishing the direct communication link is shown, wherein the XR device 402 and the computing device 404 establish the direct communication link between themselves using the network address of the computing device 404 and the network address of the XR device 402, respectively. Consequently, the XR device 402 sends, to the computing device 404, information indicative of a pose of the XR device 402 or of a head of a user of the XR device 402, via the direct communication link. The XR device 402 receives, from the computing device 404, XR image(s) generated according to said pose, via the direct communication link, for display thereat.

FIGS. 4A-4C are merely examples, which should not unduly limit the scope of the claims herein. A person skilled in the art will recognize many variations, alternatives, and modifications of embodiments of the present disclosure.

Figure 5:
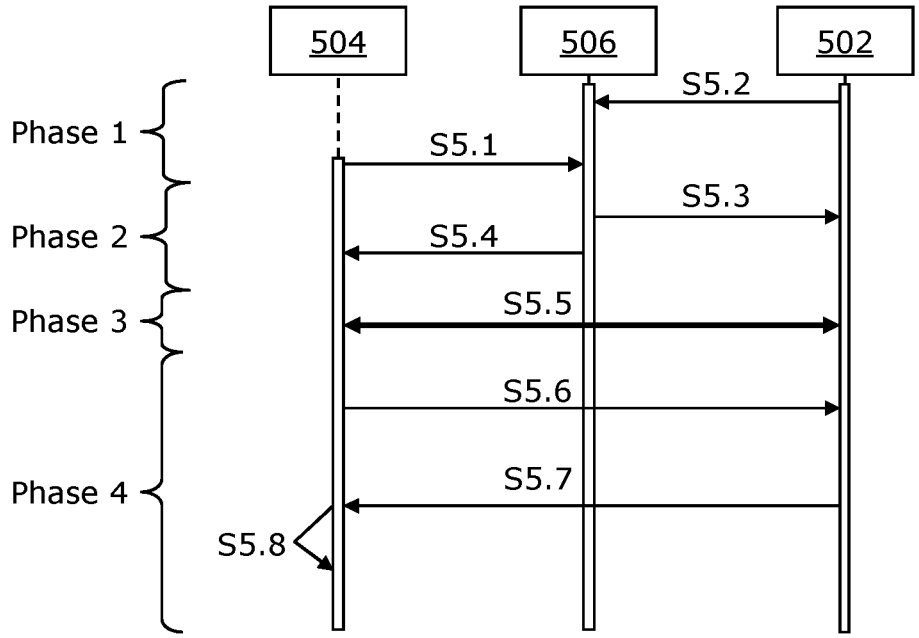
FIG. 5 illustrates an exemplary process flow for using a computing device for rendering and streaming, in accordance with an embodiment of the present disclosure.

Referring to FIG. 5, illustrates an exemplary process flow for using a computing device 502 for rendering and streaming, in accordance with an embodiment of the present disclosure. At step S5.1, a network address of an extended-reality (XR) device 504 is sent, by the XR device 504, to a server 506. At step S5.2, a network address of the computing device 502 is sent, by the computing device 502, to the server 506. At step S5.3, the network address of the XR device 504 is received by the computing device 502 from the server 506. At step S5.4, the network address of the computing device 502 is received by the XR device 504 from the server 506. At step S5.5, a direct communication link is established between the XR device 504 and the computing device 502 using the network address of the computing device 502 and the network address of the XR device 504. At step S5.6, information indicative of a pose of the XR device 504 or of a head of a user of the XR device 504 is sent to the computing device 502, via the direct communication link. At step S5.7, at least one XR image generated at the computing device 502, according to said pose, is received by the XR device 504 from the computing device 502. At step S5.8, the at least one XR image is displayed via at least one light source of the XR device 504.

Steps S5.1 and S5.2 constitute a first phase. Steps S5.3 and S5.4 constitute a second phase. Step S5.5 constitutes a third phase. Steps S5.6, S5.7 and S5.8 constitute a fourth phase.

The aforementioned steps are only illustrative and other alternatives can also be provided where one or more steps are added, one or more steps are removed, or one or more steps are provided in a different sequence without departing from the scope of the claims herein.

Figure 6:
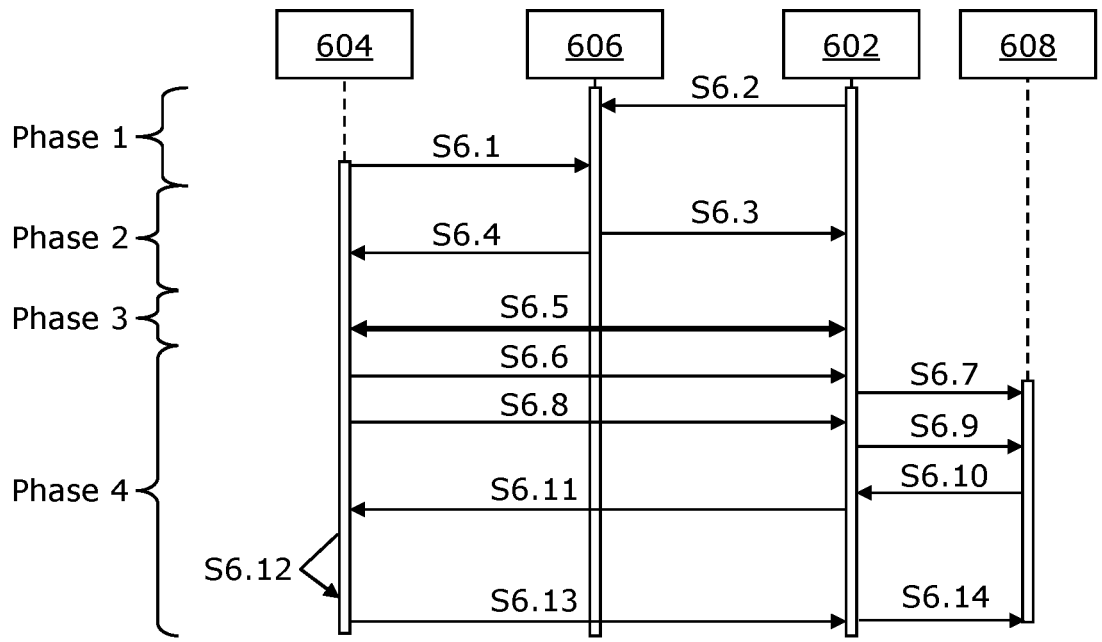
FIG. 6 illustrates another exemplary process flow for using a computing device for rendering and streaming, in accordance with an embodiment of the present disclosure.

Referring to FIG. 6, illustrated is another exemplary process flow for using a computing device 602 for rendering and streaming, in accordance with an embodiment of the present disclosure. In a first phase, at step S6.1, a network address of an extended-reality (XR) device 604 and a device configuration of the XR device 604 are sent, by the XR device 604, to a server 606. At step S6.2, a network address of the computing device 602 and a device configuration of the computing device 602 are sent, by the computing device 602, to the server 606. In a second phase, at step S6.3, the network address of the XR device 604 and the device configuration of the XR device 604 are received by the computing device 602 from the server 606. At step S6.4, the network address of the computing device 602 and the device configuration of the computing device 602 are received by the XR device 604 from the server 606. In a third phase, at step S6.5, a direct communication link is established between the XR device 604 and the computing device 602 using the network address of the computing device 602, the network address of the XR device 604, the device configuration of the XR device 604, and the device configuration of the computing device 602. In a fourth phase, at step S6.6, information indicative of a software application 608 to be executed for generating XR images is received, from the XR device 604, by the computing device 602, via the direct communication link. At step S6.7, the software application 608 is arranged (i.e., downloaded from any one of: the server 606, a third-party application provider) by the computing device 602, for execution of the software application 608. At step S6.8, information indicative of a pose of the XR device 604 or of a head of a user of the XR device 604 is sent to the computing device 602, via the direct communication link. At step S6.9, the software application 608 is executed at the computing device 606 and at step S6.10, at least one XR image is generated, based on said pose. At step S6.11, the at least one XR image is sent from the computing device 602 to the XR device 604, via the direct communication link. At step S6.12, the at least one XR image is displayed via at least one light source of the XR device 604. At step S6.13, a request for terminating the direct communication link is optionally sent from the XR device 604 to the computing device 602. At step S6.14, execution of the software application 608 is halted.

The aforementioned steps are only illustrative and other alternatives can also be provided where one or more steps are added, one or more steps are removed, or one or more steps are provided in a different sequence without departing from the scope of the claims herein.

The invention claimed is:
1. An extended-reality device comprising:
  pose-tracking means;
  at least one light source that is to be employed to display extended-reality images to a user; and
  a processor configured to:
    send, to a server, a network address of the extended-reality device;
    send, to the server, a request to provide a network address of a computing device owned by the user;

receive, from the server, the network address of the computing device;

establish a direct communication link between the extended-reality device and the computing device, using the network address of the computing device;

send, to the computing device, information indicative of a pose of the extended-reality device or of a head of the user, via the direct communication link;

receive, from the computing device, at least one extended-reality image generated according to said pose, via the direct communication link;

display the at least one extended-reality image via the at least one light source;

send, to the server, information pertaining to a device configuration of the extended-reality device;

receive, from the server, information pertaining to a device configuration of the computing device; and select a communication protocol for establishing the direct communication link, based on the device configuration of the extended-reality device and the device configuration of the computing device.

2. The extended-reality device of claim 1, wherein the processor is configured to send, to the server, information indicative of a software application to be executed at the computing device for generating extended-reality images, prior to establishing the direct communication link.

3. The extended-reality device of claim 1, wherein the processor is configured to send, to the computing device, information indicative of a software application to be executed for generating extended-reality images, after establishing the direct communication link.

4. A system comprising a plurality of extended-reality devices of claim 1 and a plurality of computing devices of the computing device of wherein a processor of each extended-reality device is configured to establish a direct communication link between said extended-reality device and a respective one of the plurality of computing devices, wherein at least one processor of a first computing device from amongst the plurality of computing devices is configured to: receive, from a server, a network address of at least one second computing device from amongst the plurality of computing devices; use the network address of the at least one second computing device to establish a direct communication link between the first computing device and the at least one second computing device; receive, from the at least one second computing device, information indicative of a pose of at least one second extended-reality device corresponding to the at least one second computing device or of a head of at least one second user of the at least one second extended-reality device; generate at least one extended-reality image, based on a pose of a first extended-reality device corresponding to the first computing device or of a head of a first user of the first extended-reality device, wherein a portion of the at least one extended-reality image indicates a relative pose of the at least one second extended-reality device or of the head of the at least one second user with respect to the pose of the first extended-reality device or of the head of the first user; and send the at least one extended-reality image to the first extended-reality device, via a corresponding direct communication link.

5. The system of claim 4, wherein said portion of the at least one extended-reality image virtually represents at least one of: the at least one second extended-reality device, the at least one second user, a body part of the at least one second user.

6. A computing device comprising at least one processor configured to:

send, to a server, a network address of the computing device;

receive, from the server, a network address of an extended-reality device of a user;

establish a direct communication link between the computing device and the extended-reality device, using the network address of the extended-reality device;

receive, from the extended-reality device, information indicative of a pose of the extended-reality device or of a head of the user, via the direct communication link;

generate at least one extended-reality image, based on said pose;

send the at least one extended-reality image to the extended-reality device, via the direct communication link;

send, to the server, information pertaining to a device configuration of the computing device;

receive, from the server, information pertaining to a device configuration of the extended-reality device; and select a communication protocol for establishing the direct communication link, based on the device configuration of the extended-reality device and the device configuration of the computing device.

7. The computing device of claim 6, wherein the at least one processor is configured to:

receive, from the server, information pertaining to a device configuration of the extended-reality device; and generate the at least one extended-reality image, based further on the device configuration of the extended-reality device.

8. The computing device of claim 6, wherein the at least one processor is configured to:

receive, from the server, information indicative of a software application to be executed for generating extended-reality images; and arrange to execute the software application prior to establishing the direct communication link.

9. The computing device of claim 8, wherein the at least one processor is configured to arrange to execute the software application by downloading the software application from any one of: the server, a third-party application provider.

10. The computing device of claim 6, wherein the at least one processor is configured to:

receive, from the extended-reality device, information indicative of a software application to be executed for generating extended-reality images, via the direct communication link; and arrange to execute the software application.

11. The computing device of claim 6, wherein a software application is executed in a secured environment in the computing device.

* * * * *